(12) United States Patent
Kim et al.

(10) Patent No.: US 11,423,460 B1
(45) Date of Patent: Aug. 23, 2022

(54) ELECTRONIC APPARATUS AND INFORMATION PROVIDING METHOD THEREOF

(71) Applicant: Coupang Corp., Seoul (KR)

(72) Inventors: Jin Hee Kim, Seoul (KR); Hyun Ah Oh, Seoul (KR); Nae Jin Hyeon, Seoul (KR); Ah Reum Hoang, Seoul (KR); Lei Wang, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/236,864

(22) Filed: Apr. 21, 2021

(30) Foreign Application Priority Data

Mar. 31, 2021 (KR) .................... 10-2021-0042311

(51) Int. Cl.
| G06Q 30/00 | (2012.01) |
| G06Q 30/06 | (2012.01) |
| G06Q 30/02 | (2012.01) |
| G06F 16/245 | (2019.01) |
| G06F 40/279 | (2020.01) |
| G06N 20/00 | (2019.01) |
| G06K 9/62 | (2022.01) |
| G06F 3/14 | (2006.01) |
| G06F 16/248 | (2019.01) |

(52) U.S. Cl.
CPC .......... *G06Q 30/0627* (2013.01); *G06F 3/14* (2013.01); *G06F 16/245* (2019.01); *G06F 16/248* (2019.01); *G06F 40/279* (2020.01); *G06K 9/6201* (2013.01); *G06N 20/00* (2019.01); *G06Q 30/0201* (2013.01); *G06Q 30/0643* (2013.01)

(58) Field of Classification Search
None
See application file for complete search history.

(56) References Cited

U.S. PATENT DOCUMENTS

| 7,792,821 | B2 * | 9/2010 | Shakib .................. G06F 16/951 |
| | | | 707/714 |
| 9,489,400 | B1 * | 11/2016 | Haitani .................... G06F 16/26 |
| 10,606,884 | B1 * | 3/2020 | Mongrain ............. G06F 16/583 |

(Continued)

FOREIGN PATENT DOCUMENTS

| JP | 2010503914 | 2/2010 |
| JP | 6154968 | 6/2017 |

(Continued)

OTHER PUBLICATIONS

Zheng Qin, "Introduction to E-commerce", 2009, Springer, springer. com (Year: 2009).*

(Continued)

*Primary Examiner* — Naeem U Haq
*Assistant Examiner* — Norman Donald Sutch, Jr.
(74) *Attorney, Agent, or Firm* — Knobbe, Martens, Olson & Bear, LLP

(57) ABSTRACT

An information providing method of an electronic apparatus is disclosed. The information providing method may include acquiring a search term from a user, identifying a product list corresponding to the search term, identifying one or more categories corresponding to the search term to filter the product list, and displaying the product list in a first area and displaying the one or more categories in a second area distinguished from the first area.

14 Claims, 6 Drawing Sheets

(56) References Cited

U.S. PATENT DOCUMENTS

| | | | | |
|---|---|---|---|---|
| 10,824,942 | B1* | 11/2020 | Bhotika | G06F 16/51 |
| 10,832,400 | B1* | 11/2020 | Tang | G06K 9/6227 |
| 2007/0027856 | A1 | 2/2007 | Lee | |
| 2013/0085900 | A1* | 4/2013 | Williams | G06Q 30/0601 |
| | | | | 705/27.2 |
| 2016/0085813 | A1* | 3/2016 | Setty | G06K 9/00671 |
| | | | | 705/26.3 |
| 2016/0203183 | A1* | 7/2016 | Katakawa | H04L 67/1008 |
| | | | | 707/718 |
| 2017/0061015 | A1* | 3/2017 | Gungor | G06F 16/2425 |
| 2018/0204275 | A1* | 7/2018 | Shimokawa | G06Q 50/28 |
| 2019/0012716 | A1 | 1/2019 | Murakami | |
| 2020/0265491 | A1* | 8/2020 | Young | G06Q 30/0603 |
| 2021/0182913 | A1* | 6/2021 | Hwang | G06N 20/00 |

FOREIGN PATENT DOCUMENTS

| | | |
|---|---|---|
| KR | 1020070013867 | 1/2007 |
| KR | 101048540 | 7/2011 |
| KR | 20150081151 A | 7/2015 |
| KR | 101616958 B1 | 4/2016 |
| KR | 101707660 | 2/2017 |
| KR | 1020170014306 | 2/2017 |
| KR | 1020170085771 | 7/2017 |
| KR | 102082900 | 2/2020 |
| KR | 20200046184 A | 5/2020 |
| WO | WO 2008033138 A1 | 3/2008 |

OTHER PUBLICATIONS

Nadine; "How to Choose Ski Length: Making Sure you Get it Right"; Sep. 27, 2019; skiprofiles.com (Year: 2019).*

Mika Kaki et al; "Findex: improving search result use through automatic filtering categories"; Jan. 2005; Interacting with Computers 17 (2005) 187-206 (Year: 2005).*

* cited by examiner

ELECTRONIC APPARATUS AND INFORMATION PROVIDING METHOD THEREOF

BACKGROUND

Technical Field

The present disclosure relates to an electronic apparatus for providing information related to categories for classifying items of a list corresponding to a search term input by a buyer by length and an information providing method of the electronic apparatus.

Description of the Related Art

When a buyer tries to purchase a product using an application, the buyer may input a search term, and a product list corresponding to the search term may be displayed on a screen. Here, it is a significant online factor to provide information related to products which may be purchased by the buyer, and thus providing the related information for the buyer's convenience of use may be a competitive advantage in online commerce. Accordingly, there is a necessity for a technology for inducing a buyer to make a purchase and effectively providing relevant information corresponding to a search term input by a buyer so as to improve convenience in service provision.

SUMMARY

Technical Goals

An aspect of the present disclosure is directed to providing an electronic apparatus and an information providing method of the electronic apparatus. Goals of the present disclosure are not limited to those described above, and other goals may be inferred from the following example embodiments.

Technical Solutions

According to an aspect, there is provided an information providing method of an electronic apparatus includes acquiring a search term from a user, identifying a product list corresponding to the search term, identifying one or more categories corresponding to the search term to filter the product list, and displaying the product list in a first area and displaying the one or more categories in a second area distinguished from the first area. When the search term corresponds to a specific product group, the one or more categories are classified based on a product length.

The information providing method may further include, when the category is selected from the one or more categories displayed in the second area, displaying at least one product, which corresponds to the selected category in the product list, in the first area.

The identifying of the one or more categories may include, when the search term corresponds to a preset dataset, identifying one or more categories corresponding to the search term.

Information related to a length of the product included in the product list may be set by a seller of the products to correspond to one of the one or more categories, and the product list may be displayed in the first area on the basis of, or based on, the set information related to the length in response to a category selection corresponding to the one of the one or more categories.

When the information set by the seller does not match an image corresponding to the product, the information related to the length may be changed by applying a machine-learning model on the basis of the image.

The one or more categories may correspond to at least one of a first category, a second category, and a third category, a length corresponding to the first category may be the longest, and a length corresponding to the third category may be the shortest.

The length corresponding to each of the first category, the second category, and the third category may be variably determined on the basis of information related to the user.

The displaying of the one or more categories in the second area may include displaying an image corresponding to each of the one or more categories.

The image may be determined on the basis of information related to the product selected from the products included in the category corresponding to the image.

The image may be updated on the basis of a preset time condition.

The selected product may be selected from the products included in the category corresponding to the image on the basis of at least one of sales volume information and review information.

The identifying of the one or more categories may include, when the products corresponding to the specific product group are included in the product list corresponding to the search term at a certain ratio or more, identifying the one or more categories.

The displaying of the one or more categories in the second area may include displaying an icon corresponding to each of the one or more categories.

According to another aspect, there is also provided an electronic apparatus including a communication device, a display, and a controller configured to identify a search term acquired from a user, identify a product list corresponding to the search term, identify one or more categories corresponding to the search term to filter the product list, and provide relevant information to display the product list in a first area and display the one or more categories in a second area distinguished from the first area. When the search term corresponds to a specific product group, the one or more categories are classified by a length of a product.

According to still another aspect, there is also provided a non-transitory recording medium on which a program for executing the above-described method in a computer is recorded.

Details of other aspects are included in the Detailed Description and the accompanying drawings.

Effects

According to the present disclosure, an electronic apparatus can identify a product list corresponding to a search term to display relevant information in a first area and can identify one or more categories for filtering the product list to display the one or more categories in a second area distinguished from the first area. When the search term corresponds to a specific product group, one or more categories related to length can be displayed in the second area, and the product list displayed in the first area can be filtered according to a category selection and displayed such that a user's convenience in product search can be increased. Also, an image corresponding to the category related to length can be displayed therewith and automatically updated under a certain condition such that convenience in image management can be improved. Further, the category related to length can be variably determined on the basis of user information, and thus a product list suited to a user's body can be provided such that the purchase rate of the user can be increased. In addition, when it is determined through a machine-learning model that information input by a seller does not match an image, the information input by the seller can be changed on the basis of the image, or when a seller does not input relevant information, information related to the length of a product can be registered using the machine-learning model.

Effects of the present disclosure are not limited to those described above, and other effects which have not been described will be clearly understood by those of ordinary skill in the art from the claims.

DETAILED DESCRIPTION

As terms used in example embodiments, general terms that are widely used at present are selected, when possible, in consideration of functions in the present disclosure, but the terms may vary according to intentions of those of ordinary skill in the art, precedents, the advent of new technologies, and the like. Some terms may be arbitrarily chosen by the present applicant, and in this case, the meanings of these terms will be described in the corresponding parts of description in detail. Accordingly, the terms used herein should be defined not on the basis of the names thereof but on the basis of the meanings thereof and the whole context of the present disclosure.

Throughout the specification, it will be understood that when a part is referred to as "including" an element, the part does not preclude other elements and may further include other elements unless particularly otherwise stated. Also, terms including "unit," "module," etc. used herein refer to units which perform at least one function or operation, and the unit, module, etc. may be implemented as hardware, software, or a combination of hardware and software.

Throughout the specification, the expression "at least one of a, b, and c" indicates only a, only b, only c, both a and b, both a and c, both b and c, and all of a, b, and c.

As used herein, a "terminal" may be implemented as a computer or a portable terminal which may access a server or another terminal via a network. Here, the computer includes, for example, a notebook computer, a desktop computer, a laptop computer, etc. in which a web browser is installed, and the portable terminal is a wireless communication device with portability and mobility and may include all kinds of handheld-based wireless communication devices such as communication-based terminals, smart phones, and tablet personal computers (PCs) which support international mobile telecommunication (IMT), code division multiple access (CDMA), wideband CDMA (W-CDMA), long term evolution (LTE), and the like.

Hereinafter, example embodiments of the present disclosure will be described in detail with reference to the accompanying drawings so that those of ordinary skill in the art may easily implement the present disclosure. However, the present disclosure may be implemented in various different forms and is not limited to the example embodiments set forth herein.

The example embodiments of the present disclosure will be described in detail below with reference to the drawings.

Figure 1:
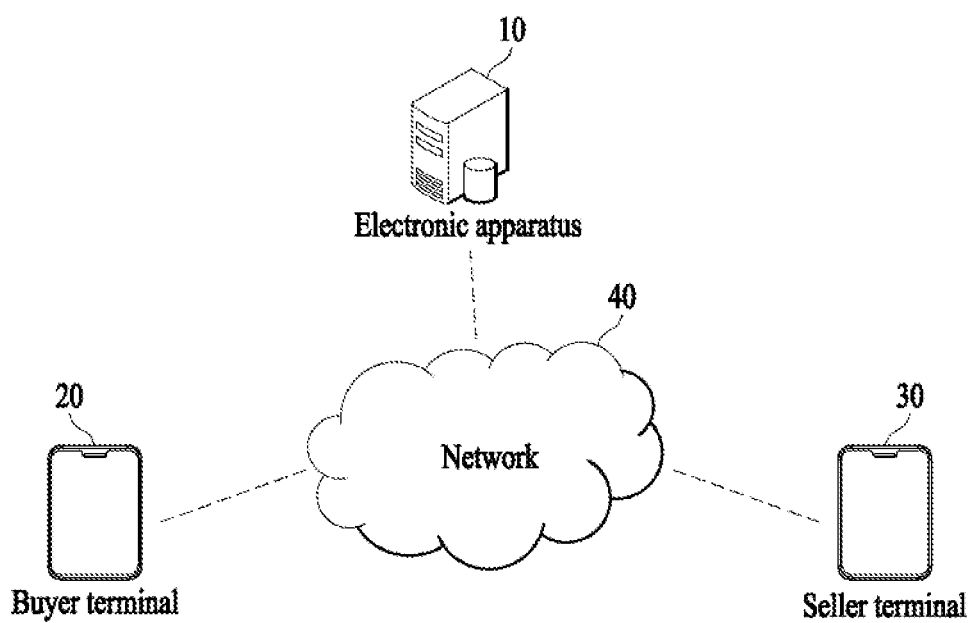
FIG. 1 is a diagram of a system according to an example embodiment.

FIG. 1 is a diagram of a system according to an example embodiment.

Referring to FIG. 1, the system may include an electronic apparatus 10, a buyer terminal 20, a seller terminal 30, and a network 40. In the system shown in FIG. 1, only elements related to the present embodiment are shown. Accordingly, those of ordinary skill in the art may understand that general-use elements other than those shown in FIG. 1 may be further included.

The electronic apparatus 10, the buyer terminal 20, and the seller terminal 30 may communicate with each other through the network 40. The network 40 includes a local area network (LAN), a wide area network (WAN), a value added network (VAN), a mobile radio communication network, a satellite communication network, and combinations thereof. The network 40 is a data communication network having a comprehensive meaning that the network elements shown in FIG. 1 are allowed to smoothly communicate with each other and may include wired Internet, wireless Internet, and a mobile wireless communication network. Wireless communication may be, for example, wireless LAN (WLAN) (e.g., wireless fidelity (Wi-Fi)), Bluetooth, Bluetooth low energy, ZigBee, Wi-Fi direct (WFD), ultra-wideband (UWB), infrared data association (IrDA), near field communication (NFC), etc. but is not limited thereto.

The electronic apparatus 10 may provide all pieces of information related to products to sell the products to buyers and may be included in a server which provides the information related to the products. Specifically, the electronic apparatus 10 may identify product-related information input by a seller through the seller terminal 30. Also, the electronic apparatus 10 may identify a search term input by a buyer. The electronic apparatus 10 may identify a product list corresponding to the search term and provide relevant information using an application installed on the buyer terminal 20. Here, the product list corresponding to the search term may be displayed in a first area, and information related to one or more categories corresponding to the search term may be displayed in a second area distinguished from the first area.

The electronic apparatus 10 may provide an application for providing information to the buyer terminal 20 and the seller terminal 30. The buyer terminal 20 may be a terminal used by the buyer, and the seller terminal 30 may be a terminal used by the seller. The seller may provide product-related information to the electronic apparatus 10 through the seller terminal 30, and the buyer may check the product list corresponding to the search term through the buyer terminal 20 using the information provided by the electronic apparatus 10.

A detailed process performed by the electronic apparatus 10, the buyer terminal 20, and the seller terminal 30 with regard to information providing will be described below.

Figure 2:
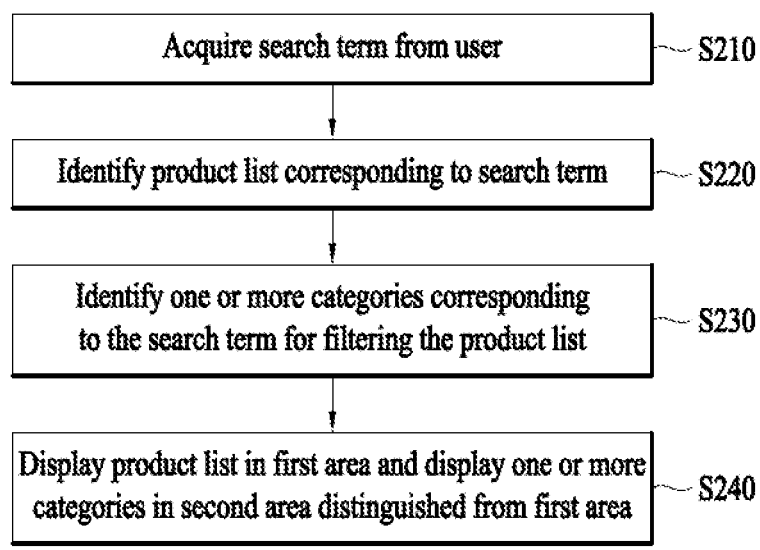
FIG. 2 is a flowchart illustrating an information providing method performed in an electronic apparatus according to an example embodiment.

FIG. 2 is a flowchart illustrating an information providing method performed in an electronic apparatus according to an example embodiment.

Referring to FIG. 2, in operation S210, an electronic apparatus may acquire a search term from a user. Here, the user may be a buyer and may input the search term using a buyer terminal, and the electronic apparatus may identify the input search term using an application.

According to the example embodiment, when the user inputs a search term consisting of one word, the electronic apparatus may identify information related to products corresponding to the search term on the basis of information previously stored in a database. For example, when the user inputs "dress," the electronic apparatus may identify information related to products corresponding to "dress" on the basis of the information previously stored in the database. Here, a "dress" is a kind of female clothing and may be classified as a "long dress," a "medium dress," or a "mini dress" according to the length from the waist to the lower end. Alternatively, when the user inputs a search term consisting of several words, the electronic apparatus may identify information related to products corresponding to the search term identified through syntactic analysis. For example, when the user inputs "dresses frequently worn by women in their twenties?", the electronic apparatus may extract "dresses," "women," and "twenties" by analyzing the search term through syntactic analysis and identify information related to products corresponding to the extracted search words. Here, a learning model based on a neural network may be used for syntactic analysis, and details of a relevant technical field may apply.

According to the example embodiment, when the search term input by the user corresponds to a specific product group, the electronic apparatus may identify one or more categories corresponding to the search term. Here, the specific product group is a product group corresponding to a preset dataset. When the search term corresponds to a specific product group included in the preset dataset, the electronic apparatus may identify one or more categories corresponding to the search term. On the other hand, when the search term does not correspond to a specific product group included in the preset dataset, the electronic apparatus may not identify one or more categories corresponding to the search term. For example, when the search term "dress" corresponds to a specific product group included in the preset dataset, the electronic apparatus may identify a first category to a third category corresponding to the search term. On the other hand, when the search term "T-shirt" does not correspond to a specific product group included in the preset dataset, the electronic apparatus may not identify one or more categories corresponding to the search term "T-shirt." Here, the specific product group included in the preset dataset may correspond to products whose length is a main factor in product selection. For example, a "dress" is a product, such as a "long dress," a "medium dress," or a "mini dress," whose length is a main factor in product selection, and "dress" may correspond to a specific product group.

According to the example embodiment, when products corresponding to the specific product group are included in a product list corresponding to the search term input by the user at a certain ratio or more, the electronic apparatus may identify one or more categories corresponding to the search term. When products corresponding to the specific product group are included in the products, which are found through the search term rather than a category matching the search term, at the certain ratio or more, one or more categories corresponding to the search term may be identified. For example, when the user inputs the search term "summer female clothing," product 1 and product 2 to product N may be displayed through the search term "summer female clothing." In this case, some of product 1 and product 2 to product N may correspond to a specific product group, and others may not correspond to the specific product group. Here, when products corresponding to the specific product group are included at the certain ratio or more, the electronic apparatus may identify one or more categories corresponding to the search term. For example, when "dresses" are included in a plurality of products found through the search term "summer female clothing" at the certain ratio or more, the electronic apparatus may display one or more categories corresponding to the search term. On the contrary, when "dresses" are not included at the certain ratio or more, the electronic apparatus may not display one or more categories corresponding to the search term. For this reason, whether to display a category is determined according to whether the products found through the search term match a specific product group rather than whether a category matches the search term, and thus the electronic apparatus can effectively determine whether to display a category.

In operation S220, the electronic apparatus may identify a product list corresponding to the search term. The buyer may search for products on the basis of information uploaded to the electronic apparatus by a seller and purchase a desired product among found products. When a product is uploaded to the electronic apparatus, information related to the product may be input. Here, the information related to the product may include information related to the length of the product. Specifically, for some products sold through the electronic apparatus, product length may be a significant factor in product purchase, and relevant information may be input when the product is uploaded. For example, in the case of a "dress" product which is a kind of female clothing, the product length may vary such as a "long dress," a "medium dress," or a "mini dress," and the length may be a significant factor in product purchase. Here, the seller may input information related to the length from the waist to the lower end of the "dress." For example, when inputting information related to the "dress," the seller may input information related to a specific length such as a length of 45 centimeters (cm) from the waist to the lower end. On the other hand, the seller may classify "dresses" as "long dresses," "medium dresses," and "mini dresses" and input the relevant information. For example, when inputting information related to "dresses," the seller may select "medium dresses" and input information on the length of a product being uploaded.

Alternatively, when a product is uploaded to the electronic apparatus, information related to the length of the product may be identified through a machine-learning model on the basis of image information related to the product even when the seller does not input information related to the product. Specifically, the electronic apparatus may determine information related to the length of the product on the basis of the image information related to the product. For example, when the seller does not input information related to the length regarding a "dress" product, the electronic apparatus may automatically determine information related to the length on the basis of image information of the "dress" product. Alternatively, when a product is uploaded to the electronic apparatus, information set by the seller may not match an image corresponding to the product. In this case, the electronic apparatus may change the information related to the length to information identified from the image through the machine-learning model. Specifically, when the seller inputs "long dress," the electronic apparatus may identify the information "mini dress" from an image through the machine-learning model. In this case, the electronic apparatus may change "long dress," that is, information related to the length, to "mini dress." The machine-learning model may be trained in advance on the basis of technology applying to a relevant technical field.

In operation S230, the electronic apparatus may identify one or more categories corresponding to the search term to filter the product list. When the search term corresponds to a specific product group, the electronic apparatus may identify one or more categories corresponding to the search term. Here, the one or more categories may be categories classified based on a product length. The one or more categories may include at least one of a first category, a second category, and a third category. In this case, a length corresponding to the first category may be the longest, and a length corresponding to the third category may be the shortest. For example, the search term "dress" corresponds to a specific product group, and the electronic apparatus may identify "long dress" as the first category, identify "medium dress" as the second category, and identify "mini dress" as the third category.

According to the example embodiment, when the first category is selected, the electronic apparatus may identify a product list corresponding to the first category among a plurality of product lists corresponding to the search term. For example, when "long dress" is selected as the first category from a plurality of product lists corresponding to "dress," the electronic apparatus may only identify a plurality of products corresponding to "long dress." When "medium dress" is selected as the second category from the plurality of product lists corresponding to "dress," the electronic apparatus may only identify a plurality of products corresponding to "medium dress." When "mini dress" is selected as the third category from the plurality of product lists corresponding to "dress," the electronic apparatus may only identify a plurality of products corresponding to "mini dress." Since the seller inputs length-related information as product-related information, the electronic apparatus may only identify products corresponding to the category on the basis of the length-related information.

In operation S240, the electronic apparatus may display the product list in a first area and display one or more categories in a second area distinguished from the first area.

In a screen displayed in the buyer terminal, the product list corresponding to the search term may be displayed in the first area, and information and images of one or more categories may be displayed in the second area distinguished from the first area. For example, a product list corresponding to the search term "dress" may be displayed in the first area, and information and images of categories (e.g., a length, a season, and a size) for filtering the product list may be displayed in the second area distinguished from the first area. Accordingly, when a category is selected from the one or more categories displayed in the second area, a plurality of products corresponding to the selected category in the product list displayed in the first area may be displayed in the first area. For example, when "long dress" is selected as a category displayed in the second area while a plurality of products corresponding to the search term "dress" are displayed in the first area, only a plurality of products corresponding to "long dress" may be displayed in the first area. In other words, only products obtained by filtering a plurality of products according to the category selected in the second area may be displayed in the first area on the basis of, or based on, length-related information set by the seller.

According to the example embodiment, the electronic apparatus may display an image corresponding to each of one or more categories. Here, the image may be determined on the basis of information related to a product selected on the basis of at least one of sales volume information and review information from the products obtained by filtering the plurality of products according to the category. For example, the electronic apparatus may determine an image corresponding to the category "long dress" on the basis of information related to a product which is selected on the basis of at least one of sales volume information and review information from products included in the category "long dress." Alternatively, the electronic apparatus may determine an image corresponding to the category "medium dress" on the basis of information related to a product which is selected on the basis of at least one of sales volume information and review information from products included in the category "medium dress." Alternatively, the electronic apparatus may determine an image corresponding to the category "mini dress" on the basis of information related to a product which is selected on the basis of at least one of sales volume information and review information from products included in the category "mini dress." More specifically, the electronic apparatus may determine an image corresponding to a product having the highest sales volume among products included in the category "long dress" as an image corresponding to the category "long dress." Alternatively, the electronic apparatus may determine an image corresponding to a product having the highest sales volume among products included in the category "medium dress" as an image corresponding to the category "medium dress." Alternatively, the electronic apparatus may determine an image corresponding to a product having the highest sales volume among products included in the category "mini dress" as an image corresponding to the category "mini dress." Alternatively, the electronic apparatus may determine an image corresponding to a product having the highest evaluation rating based on review information among products included in the category "long dress" as an image corresponding to the category "long dress." Alternatively, the electronic apparatus may determine an image corresponding to a product having the highest evaluation rating based on review information among products included in the category "medium dress" as an image corresponding to the category "medium dress." Alternatively, the electronic apparatus may determine an image corresponding to a product having the highest evaluation rating based on review information among products included in the category "mini dress" as an image corresponding to the category "mini dress." When an image corresponding to a category is displayed on the basis of at least one of sales volume information and review information as such, the buyer can check a style corresponding to each category more intuitively such that a purchase rate can be increased.

According to the example embodiment, an image corresponding to a category may be updated under a preset time condition. Specifically, when a new product among products included in a category is released to the market, an image corresponding to the category may be updated, or an image corresponding to a category may be updated at preset time intervals (e.g., every month). Alternatively, an image corresponding to a category may be updated on the basis of attributes of products included in the category. In this case, the electronic apparatus may set an update cycle according to the attributes of the products on the basis of statistical information and update an image on the basis of the preset update cycle. Specifically, when products included in a category are related to fashion, the update cycle of an image corresponding to the category may be relatively short due to the characteristic of the fashion industry being trendy. On the other hand, when products included in a category are related to home appliances, the update cycle of an image corresponding to the category may be relatively long due to characteristics of home appliances. For example, when product lists based on a search term correspond to home appliances, a new product included in the category may be released to the market, and an image corresponding to the category may be updated. In this case, the update cycle of the image corresponding to the category related to home appliances may be longer than the update cycle of the image corresponding to the category related to fashion products.

According to the example embodiment, the order of categories displayed in the second area may be determined on the basis of at least one of sales volume information and review information. Specifically, the order of categories may be determined on the basis of at least one of the sales volume information and the review information of products included in each category. For example, when first, second, and third categories are "long dress," "medium dress," and "mini dress," respectively, the order of categories displayed in the second area may be determined from among the categories "long dress," "medium dress," and "mini dress" on the basis of sales volume information and review information of products included in the category "long dress," volume information and review information of products included in the category "medium dress," and volume information and review information of products included in the category "mini dress." Specifically, when sales volume decreases in the order of "medium dress," "long dress," and "mini dress," the order of categories displayed in the second area may be "medium dress," "long dress," and "mini dress" rather than "long dress," "medium dress," and "mini dress." Alternatively, the order of categories may be determined on the basis of sales volume information and review information of some products having high sales volume among products included in a category. For example, the order among the category "long dress," the category "medium dress," and the category "mini dress" may be determined on the basis of sales volume information and review information of five high-ranking products among products included in the category "long dress," sales volume information and review information of five high-ranking products among products included in the category "medium dress," and sales volume information and review information of five high-ranking products among products included in the category "mini dress."

According to the example embodiment, the size of images corresponding to the categories displayed in the second area may be determined on the basis of at least one of sales volume information and review information. Specifically, image size may be determined on the basis of sales volume information and review information of products included in each category. For example, the size of an image corresponding to each of the category "long dress," the category "medium dress," and the category "mini dress" may be determined on the basis of sales volume information and review information of products included in the category "long dress," sales volume information and review information of products included in the category "medium dress," and sales volume information and review information of products included in the category "mini dress." More specifically, on the basis of at least one of sales volume information and review information of products included in each category, the size of an image corresponding to the category "medium dress" may be the largest, the size of an image corresponding to the category "mini dress" may be the smallest.

According to the example embodiment, the size of an image corresponding to each category displayed in the second area may be determined on the basis of the buyer's purchase history information. Here, a service for providing relevant information on the basis of the purchase history information may be only provided to users who subscribe to a premium service and may not be provided to users who do not subscribe to the premium service. When the buyer corresponds to a category having purchases in the purchase history as a result of analyzing the purchase history, the size of an image corresponding to the category may be larger than the size of an image corresponding to a category without having purchases in the purchase history. The category having purchases in the purchase history reflects buyers' preferences, and providing a larger image may better induce the buyers to purchase products. When there are a plurality of categories having purchases in the purchase history, the size of an image may be determined on the basis of a ratio of the number of repeated purchases. Here, when categories have the same number of repeated purchases, the order may be controlled so that the category including a product which has been purchased most recently may be displayed first, and in this case, images may have the same size. As an example, when the buyer has purchased a product included in the category "medium dress" five times, purchased a product included in the category "long dress" three times, and purchased a product included in the category "mini dress" once, the size of images corresponding to the category "medium dress," the category "long dress," and the category "mini dress" may be determined on the basis of a ratio of the number of purchases. As another example, when the buyer has purchased a product included in the category "medium dress" five times, purchased a product included in the category "long dress" five times, and purchased a product included in the category "mini dress" once, the size of images corresponding to the category "medium dress" and the category "long dress" may be the same, but the order may be controlled so that the category "medium dress" including the most recently purchased product may be displayed before the category "long dress."

According to the example embodiment, image size may be determined in consideration of purchase history information and sales volume information. Here, since the purchase history information is more significant than the sales volume information as information suited to the buyer's purchase preference, image size may be determined by considering the purchase history information first and then the sales volume information. Details have been described above.

According to the example embodiment, the electronic apparatus may display a screen through which different pieces of information are provided on the basis of an input pattern for an image corresponding to each category. The following input patterns may be implemented separately or in combination. Specifically, when a user keeps a click on an image corresponding to each category for a certain time or more, the electronic apparatus may switch the screen to a product page from which the image is extracted. Here, the certain time is a preset time and may be, for example, three seconds. For example, when the user keeps a click on an image corresponding to the category "medium dress" for three seconds or more, the electronic apparatus may switch the screen to a product page from which the image of the category "medium dress" is extracted. In other words, due to a user's click on an image for the certain time, a product list corresponding to each category is not displayed in the first area, and the screen is switched to a product page from which a corresponding image is extracted. Accordingly, the convenience of the user who wants to purchase the corresponding product can be improved, and the purchase rate can be increased.

According to the example embodiment, the electronic apparatus may variably determine a length corresponding to each of the first category, the second category, and the third category on the basis of information related to the user. The seller may input information related to product length as "long," "medium," and "mini" or may input information related to the specific length of each product. For example, when Dress 1 has a length of 90 cm from the waist to the lower end, Dress 2 has a length of 70 cm from the waist to the lower end, and Dress 3 has a length of 40 cm from the waist to the lower end, the seller may input information related to each of the detailed lengths. Also, the electronic apparatus may acquire physical information of the user in advance. Specifically, the electronic apparatus may acquire physical information such as the user's leg length, height, weight, and body shape. Then, the electronic apparatus may differently set the criterion of a category on the basis of the user's physical information. Specifically, when the user's leg length is 100 cm, the electronic apparatus may set the criterion of the first category to a length of 85 cm or more from the waist to the lower end, set the criterion of the second category to a length of 50 cm or more from the waist to the lower end, and set the criterion of the third category to a length of less than 50 cm from the waist to the lower end. Here, Dress 1 may be a product corresponding to the first category, Dress 2 may be a product corresponding to the second category, and Dress 3 may be a product corresponding to the third category. Alternatively, when the user's leg length is 80 cm, the electronic apparatus may set the criterion of the first category to a length of 65 cm or more from the waist to the lower end, set the criterion of the second category to a length of 40 cm or more from the waist to the lower end, and set the criterion of the third category to a length of less than 40 cm from the waist to the lower end. Here, Dress 1 and Dress 2 may be products corresponding to the first category, and Dress 3 may be a product corresponding to the third category. Alternatively, when the user's leg length is 130 cm, the electronic apparatus may set the criterion of the first category to a length of 100 cm or more from the waist to the lower end, set the criterion of the second category to a length of 65 cm or more from the waist to the lower end, and set the criterion of the third category to a length of less than 65 cm from the waist to the lower end. Here, Dress 1 and Dress 2 may be products corresponding to the second category, and Dress 3 may be a product corresponding to the third category. Consequently, a product list displayed in the first area may filtered differently according to categories which are differently set on the basis of the user's physical information.

Figure 3:
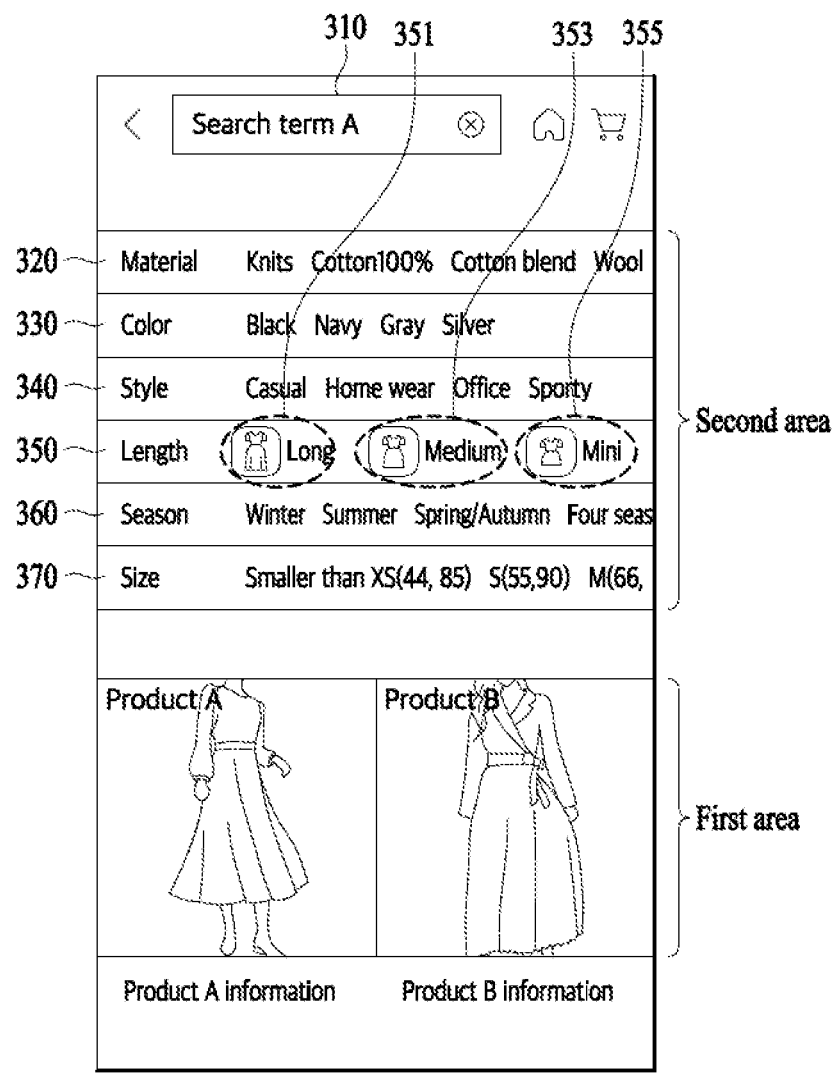
FIG. 3 shows a screen displayed on the basis of a search term according to an example embodiment.

FIG. 3 shows a screen displayed on the basis of a search term according to an example embodiment.

Referring to FIG. 3, Search term A may be input to an input window 310 by a user. The electronic apparatus may identify a product list corresponding to Search term A. For example, when the user inputs "dress" as a search term, the electronic apparatus may identify a product list corresponding to "dress."

The product list corresponding to Search term A may be displayed in the first area. As shown in FIG. 3, an image of Product B and Product B information may be displayed together, and an image of Product A and Product A information may be displayed together. Here, products displayed in the first area may be classified on the basis of criteria displayed in the second area (e.g., a material 320, a color 330, a style 340, a length 350, a season 360, and a size 370). For example, when Summer is selected in the season 360, dress products suited to summer may be displayed in the first area. Alternatively, when Black is selected in the color 330, black dress products may be displayed in the first area.

When Search term A corresponds to a specific product group, the electronic apparatus may display one or more categories related to the length 350 corresponding to the search term in the second area. When Search term A does not correspond to a specific product group, the electronic apparatus may not display one or more categories related to the length 350 corresponding to the search term in the second area. In other words, one or more categories related to the length 350 may be displayed in the second area when Search term A corresponds to a specific product group. Here, the specific product group may include products, such as "dresses," "pants," or "skirts," as products whose length is a main factor in product selection.

Here, categories corresponding to the length 350 may be classified into a first category 351 with the longest length, a second category 353, and a third category 355 with the shortest length. For example, the category "long dress" may correspond to the first category 351, the category "medium dress" may correspond to the second category 353, and the category "mini dress" may correspond to the third category 355. Icons each corresponding to the first category 351, the second category 353, and the third category 355 as the categories corresponding to the length 350 may be displayed together as shown in FIG. 3.

According to the example embodiment, the order of categories displayed in the second area with regard to the length 350 may be determined on the basis of, or based on, sales volume information and review information. Specifically, the order of categories may be determined on the basis of sales volume information and review information of products included in each category related to the length 350. Alternatively, the order of categories may be determined on the basis of some products having high sales volume among products included in each category related to the length 350. For example, the order among the category "long dress" 351, the category "medium dress" 353, and the category "mini dress" 355 may be determined on the basis of sales volume information and review information of five high-ranking products among products included in the category "long dress" 351, sales volume information and review information of five high-ranking products among products included in the category "medium dress" 353, and sales volume information and review information of five high-ranking products among products included in the category "mini dress" 355.

Figure 4:
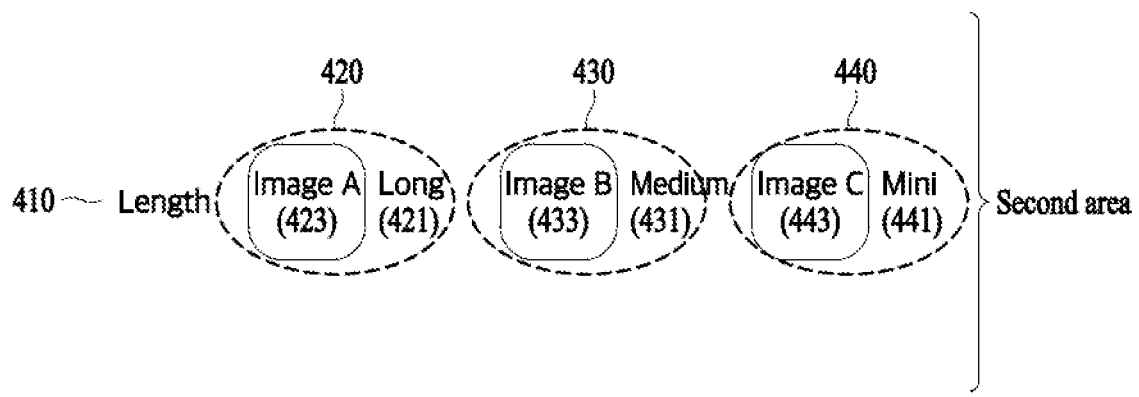
FIG. 4 shows a screen on which categories related to length are displayed in a second area according to an example embodiment.

FIG. 4 shows a screen on which categories related to length are displayed in the second area according to an example embodiment.

Referring to FIG. 4, when a search term corresponds to a specific product group or products corresponding to the specific product group are included in a product list corresponding to the search term at a certain ratio or more, one or more categories related to a length 410 may be displayed in the second area. When a search term does not correspond to a specific product group or products corresponding to the specific product group are included in the product list corresponding to the search term at less than the certain ratio, one or more categories related to the length 410 may not be displayed in the second area.

One or more categories related to the length 410 may include a first category 420, a second category 430, and a third category 440. Here, the first category 420 may correspond to a long category 421 whose products are the longest, and an image A 423 may be displayed therewith. Also, the third category 440 may correspond to a mini category 441 whose products are the shortest, and an image C 443 may be displayed therewith. Also, the second category 430 may correspond to a medium category 431 whose products have medium lengths, and an image B 433 may be displayed therewith.

According to the example embodiment, the image A 423 may be determined from among the products included in the first category 420 on the basis of at least one of sales volume information and review information. For example, an image of a product having the highest sales volume among the products included in the first category 420 may be determined as the image A 423. Alternatively, the image B 433 may be determined from among the products included in the second category 430 on the basis of at least one of sales volume information and review information. For example, an image of a product having the highest sales volume among the products included in the second category 430 may be determined as the image B 433. Alternatively, the image C 443 may be determined from among the products included in the third category 440 on the basis of at least one of sales volume information and review information. For example, an image of a product having the highest sales volume among the products included in the third category 440 may be determined as the image C 443.

According to the example embodiment, the display order among the first category 420, the second category 430, and the third category 440 may be determined on the basis of sales volume information and review information. For example, when the sales volume rankings of products included in each category are in the order of the second category 430, the first category 420, and the third category 440, the display order in the second area may be changed to the order of the second category 430, the first category 420, and the third category 440.

According to the example embodiment, the size of the image A 423, the image B 433, and the image C 443 may be determined on the basis of sales volume information and review information. For example, when the sales volume ranking of products included in each category is in the order of the second category 430, the first category 420, and the third category 440, the image B 433 may have the largest size, and the image C 443 may have the smallest size. Alternatively, the size of the image A 423, the image B 433, and the image C 443 may be determined on the basis of a user's purchase history in addition to sales volume information and review information.

According to the example embodiment, when a mouse pointer is located on an image corresponding to each category related to the length 410, the electronic apparatus may additionally display images of some top products with high sales volume in a list of products included in the category without screen transition. For example, when the mouse pointer is located on the image A 423 corresponding to the first category 420, images of the top three products with high sales volume in a list of products included in the first category 420 may be additionally displayed on the current screen without screen transition. Accordingly, the user can check the products with high sales volume in the first category 420 on the current screen without screen transition, convenience in comparison between products can be improved, and a purchase rate can be increased. Here, the product images may be additionally displayed on the current screen without screen transition in various ways.

According to the example embodiment, the electronic apparatus may display a screen through which different pieces of information are provided on the basis of the input pattern of images corresponding to each category related to the length 410. The following input patterns may be implemented separately or in combination. For example, when the user keeps a click on the image C 443 corresponding to the category 441 "mini dress" for the certain time (e.g., three seconds) or more, the electronic apparatus may switch the screen to a product page from which the image C 443 is extracted. Accordingly, due to the user's click, a screen including a product list corresponding to the category 441 "mini dress" is not displayed, and the screen is switched to the product page from which the corresponding image C 443 of the category 441 "mini dress" is extracted. Accordingly, the convenience of the user who wants to purchase the corresponding product can be improved, and the purchase rate can be increased.

Figure 5:
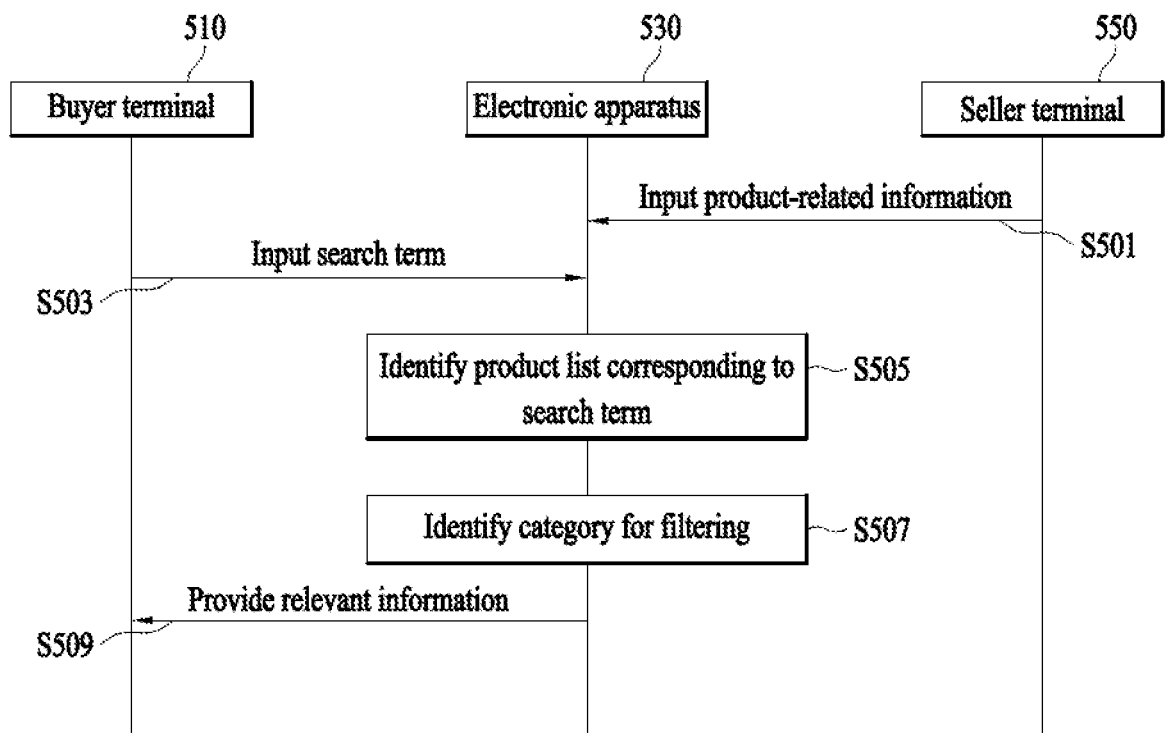
FIG. 5 illustrates an operating method of an electronic apparatus according to an example embodiment.

FIG. 5 illustrates an operating method of an electronic apparatus according to an example embodiment.

Referring to FIG. 5, in operation S501, a seller terminal 550 may input and transmit information related to a product to an electronic apparatus 530. Specifically, when registering a product for sale, a seller may input information related to the product using an application installed on the seller terminal 550, and the electronic apparatus 530 may identify the information related to the product through the application. Here, the information related to the product may include information related to the length of the product. For example, when the product is a dress, the information related to the product may include information related to the length from the waist to the lower end.

In operation S503, a buyer may input a search term to a buyer terminal 510, and the electronic apparatus 530 may acquire the input search term through the application. For example, when the user (buyer) inputs "dress" to a search term input window of the application, the electronic apparatus 530 may acquire the input search term through the application.

In operation S505, the electronic apparatus 530 may identify a product list corresponding to the search term. Specifically, the electronic apparatus 530 may identify a plurality of products corresponding to the search term and then display the product list in a first area.

In operation S507, the electronic apparatus 530 may identify categories for filtering. Here, the electronic apparatus 530 may determine whether the search term corresponds to a specific product group included in a preset dataset. When the search term corresponds to the specific product group, the electronic apparatus 530 may identify categories related to length for filtering. Alternatively, the electronic apparatus 530 may determine whether products corresponding to the specific product group are included in the product list corresponding to the search term input by the user at a certain ratio or more. When products corresponding to the specific product group are included in the product list corresponding to the search at the certain ratio or more, the electronic apparatus 530 may identify categories related to length for filtering. The categories related to length for filtering may be displayed in a second area distinguished from the first area.

With a selection of a category, the product list displayed in the first area may be filtered and displayed. For example, when a first category is selected, only products corresponding to the first category in the product list corresponding to the search term may be displayed in the first area.

In operation S509, the electronic apparatus 530 may provide relevant information to the buyer terminal 510. Specifically, the electronic apparatus 530 may provide relevant information corresponding to the input search term through the application. The product list corresponding to the search term may be displayed in the first area, and information on the categories may be displayed in the second area distinguished from the first area. FIGS. 3 and 4 may exemplify a screen displayed in the buyer terminal 510.

Figure 6:
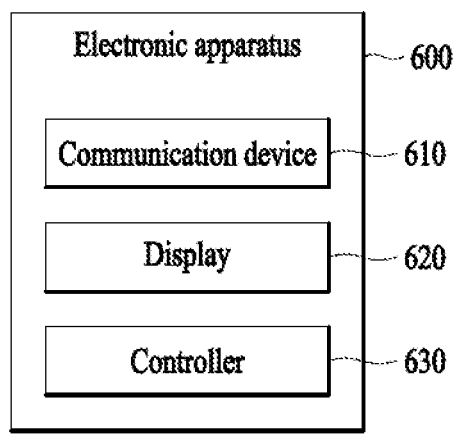
FIG. 6 is a block diagram of an electronic apparatus according to an example embodiment.

FIG. 6 is a block diagram of an electronic apparatus according to an example embodiment.

An electronic apparatus 600 may include a communication device 610, a display 620, and a controller 630 according to the example embodiment. In the electronic apparatus 600 shown in FIG. 6, only elements related to the present embodiment are shown. Accordingly, those of ordinary skill in the art may understand that general-use elements other than those shown in FIG. 6 may be further included. Since the above description of the electronic apparatus may apply to the electronic apparatus 600, a description of overlapping content is omitted.

The communication device 610 is a device for performing wired or wireless communication and may communicate with an external apparatus. The external apparatus may be a terminal or a server. Communication technology employed by the communication device 610 may be global system for mobile communication (GSM), CDMA, LTE, fifth generation (5G), WLAN, Wi-Fi, Bluetooth™, radio frequency identification (RFID), IrDA, ZigBee, NFC, and the like. According to the example embodiment, the communication device 610 may be referred to as a transceiver, and the electronic apparatus 600 may exchange information with the terminal through the transceiver.

The display 620 may display information related to the operation of the electronic apparatus 600. Alternatively, the display 620 may display information related to a screen displayed through an application.

The controller 630 may control the overall operation of the electronic apparatus 600 and process data and signals. The controller 630 may be configured with at least one hardware unit. Also, the controller 630 may be operated by one or more software modules which are generated by executing program code stored in a memory. The controller 630 may include a processor and a memory, and the processor may control the overall operation of the electronic apparatus 600 and process data and signals by executing program code stored in the memory. According to the example embodiment, the controller 630 may include at least one processor.

The controller 630 may identify a search term acquired from a user, identify a product list corresponding to the search term and provide relevant information to be displayed in a first area. Here, the controller 630 may determine whether the search term corresponds to a specific product group. Also, the controller 630 may identify one or more categories related to length to filter the product list and provide relevant information to be displayed in a second area.

An electronic apparatus or a terminal according to the above-described embodiments may include a processor, a memory in which program data is stored and executed, a permanent storage such as a disk drive, a communication port which communicates with an external device, a user interface such as a touch panel, keys, and buttons, and the like. Methods implemented as software modules or algorithms may be stored as computer-readable code or program commands, which can be executed by the processor, in a computer-readable recording medium. Examples of the computer-readable recording medium include magnetic storage media (e.g., a read-only memory (ROM), a random-access memory (RAM), a floppy disk, and a hard disk), optical reading media (e.g., a compact disc (CD)-ROM and a digital versatile disc (DVD)), and the like. The computer-readable recording medium can also be distributed over computer systems connected via a network such that the computer-readable code is stored and executed in a distributed manner. The computer-readable recording medium may be read by a computer, stored in the memory, and executed by the processor.

The example embodiments of the present disclosure may be represented as functional blocks and various processing operations. The functional blocks may be implemented as a plurality of hardware and/or software elements which execute specific functions. For example, the embodiments may employ integrated circuit elements including a memory, processing, a logic, a look-up table, etc. which may execute various functions through control of one or more microprocessors or other control devices. While elements of the embodiments may be executed by software programming or software elements, the embodiments may be implemented with programming or scripting languages including C, C++, Java, assembler, etc. to include various algorithms which are implemented as combinations of data structures, processes, routines, or other programming elements. Functional aspects may be implemented using algorithms which are executed by one or more processors. Also, the embodiments may employ conventional techniques for electronic environment setting, signal processing, data processing, and/or the like. The terms such as "mechanism," "element," "means," and "structure" may be widely used and are not limited to mechanical and physical configurations. The terms may include the meanings of a series of routines of software in connection with a processor and the like.

The above-described embodiments are only exemplary, and other embodiments may be implemented in the scope of the following claims.

What is claimed is:

1. An information providing method of an electronic apparatus, the information providing method comprising:
   acquiring a search term from a user;
   identifying a product list corresponding to the search term;
   identifying one or more categories corresponding to the search term to filter the product list;
   generating images for the one or more categories;
   adjusting sizes of the images based on sales information, review information, and/or buyer purchase history information, wherein adjusting the sizes of the images based on the buyer purchase history information includes adjusting the sizes of the images in accordance with a number of purchases in each category for each of the one or more categories; and
   displaying the product list in a first area and displaying the one or more categories with the adjusted images for the one or more categories in a second area distinguished from the first area, wherein displaying the one or more categories with the adjusted images for the one or more categories includes, when two categories have a same number of purchases in each of the two categories, ordering the two categories in accordance with which category had a more recent purchase, wherein, when the search term corresponds to a specific product group, the one or more categories are classified based on a product length, wherein identifying the one or more categories comprises, when products corresponding to the specific product group are included in the product list corresponding to the search term at a ratio greater than or equal to a predetermined ratio, identifying the one or more categories.

2. The information providing method of claim 1, further comprising, when a category is selected from the one or more categories displayed in the second area, displaying at least one product from the product list in the first area, the at least one product corresponding to the selected category.

3. The information providing method of claim 1, wherein the identifying of the one or more categories comprises, when the search term corresponds to a preset dataset, identifying one or more categories corresponding to the search term.

4. The information providing method of claim 1, wherein:
information related to a length of a product included in the product list is set by a seller of the product to correspond to one of the one or more categories, and
the product list is displayed in the first area based on set information related to the length in response to a category selection corresponding to the one of the one or more categories.

5. The information providing method of claim 4, wherein when the information set by the seller does not match an image corresponding to the product, the information related to the length is changed by applying a machine-learning model based on the image.

6. The information providing method of claim 1, wherein:
the one or more categories correspond to at least one of a first category, a second category, or a third category,
a length corresponding to the first category is a longest length, and
a length corresponding to the third category is a shortest length.

7. The information providing method of claim 6, wherein the length corresponding to each of the first category, the second category, and the third category is variably determined based on information related to the user.

8. The information providing method of claim 1, wherein the displaying of the one or more categories in the second area comprises displaying an image corresponding to each of the one or more categories.

9. The information providing method of claim 8, wherein the image corresponding to each of the of one or more categories is determined based on information related to a selected product from products included in the one or more categories corresponding to the image.

10. The information providing method of claim 9, wherein the selected product is selected from the products included in the one or more categories corresponding to the image based on at least one of sales volume information or review information.

11. The information providing method of claim 8, wherein the image corresponding to each of the one or more categories is updated based on a preset time condition.

12. The information providing method of claim 1, wherein the displaying of the one or more categories in the second area comprises displaying an icon corresponding to each of the one or more categories.

13. A non-transitory computer-readable recording medium comprising a computer program for performing an information providing method, the information providing method comprising:
acquiring a search term from a user;
identifying a product list corresponding to the search term;
identifying one or more categories corresponding to the search term to filter the product list;
generating images for the one or more categories;
adjusting sizes of the images based on sales information, review information, and/or buyer purchase history information, wherein adjusting the sizes of the images based on the buyer purchase history information includes adjusting the sizes of the images in accordance with a number of purchases in each category for each of the one or more categories; and
displaying the product list in a first area and displaying the one or more categories with the adjusted images for the one or more categories in a second area distinguished from the first area, wherein displaying the one or more categories with the adjusted images for the one or more categories includes, when two categories have a same number of purchases in each of the two categories, ordering the two categories in accordance with which category had a more recent purchase,
wherein, when the search term corresponds to a specific product group, the one or more categories are classified based on a product length,
wherein identifying the one or more categories comprises, when products corresponding to the specific product group are included in the product list corresponding to the search term at a ratio greater than or equal to a predetermined ratio, identifying the one or more categories.

14. An electronic apparatus comprising:
a communication device;
a display; and
a controller configured to:
identify a search term acquired from a user;
identify a product list corresponding to the search term;
identify one or more categories corresponding to the search term to filter the product list;
generate images for the one or more categories;
adjust sizes of the images based on sales information, review information, and/or buyer purchase history information, wherein adjusting the sizes of the images based on the buyer purchase history information includes adjusting the sizes of the images in accordance with a number of purchases in each category for each of the one or more categories; and
provide relevant information to display the product list in a first area and display the one or more categories with the adjusted images for the one or more categories in a second area distinguished from the first area, wherein displaying the one or more categories with the adjusted images for the one or more categories includes, when two categories have a same number of purchases in each of the two categories, ordering the two categories in accordance with which category had a more recent purchase,
wherein, when the search term corresponds to a specific product group, the one or more categories are classified based on a product length,
wherein the controller is configured to identify the one or more categories corresponding to the search term to filter the product list, when products corresponding to the specific product group are included in the product list corresponding to the search term at a ratio greater than or equal to a predetermined ratio.

\* \* \* \* \*